US006109773A

United States Patent [19]

Nace

[11] Patent Number: 6,109,773

[45] Date of Patent: Aug. 29, 2000

[54] MOTORCYCLE FORWARD LIGHTING

[75] Inventor: John E. Nace, Camp Hill, Pa.

[73] Assignee: Harley-Davidson Motor Company, Milwaukee, Wis.

[21] Appl. No.: 09/122,046

[22] Filed: Jul. 24, 1998

[51] Int. Cl.[7] ........................ B60Q 1/00

[52] U.S. Cl. ........................ 362/548; 362/519; 362/475; 362/390; 362/369; 362/539; 362/473

[58] Field of Search ........................ 362/548, 519, 362/474, 475, 390, 369, 539, 305, 303, 267, 473

[56] References Cited

U.S. PATENT DOCUMENTS 5,402,325 3/1995 Wisler ........................ 362/61
5,463,541 10/1995 Greene ........................ 362/369

OTHER PUBLICATIONS

1994 Custom Chrome Catalog –p. 211.

*Primary Examiner*—Cassandra Spyrou
*Assistant Examiner*—Leo Boutsikaris
*Attorney, Agent, or Firm*—Michael Best & Friedrich LLP

[57] ABSTRACT

A motorcycle forward lamp comprising a housing having an optically transmissive lens and an opening, an elastomer member mounted to the housing, and a light source assembly mounted (e.g., detachably) to the elastomer member and positioned within the opening. The light source assembly is isolated from the housing by the elastomer member. A shield is detachably mounted and positioned within the housing between the light source and the lens. A fastener and a washer are secured to the housing and positioned to maintain the light source assembly in the opening, and a dust cap is detachably mounted over the opening. The dust cap includes a notch in which the washer is positioned to thereby maintain the dust cap in position over the opening.

13 Claims, 6 Drawing Sheets

MOTORCYCLE FORWARD LIGHTING

FIELD OF THE INVENTION

This invention relates to motorcycles, and more particularly to motorcycle forward lighting, such as headlights and fog lamps.

BACKGROUND OF INVENTION

Motorcycle fog lamps are frequently mounted to motorcycles to provide a light source that enhances light provided by the main headlight and to enhance the aesthetics of the motorcycle. Such fog lamps are commonly mounted on opposing sides of the headlight.

Motorcycle fog lamps typically include a housing and a light source assembly that is rigidly attached to the housing. Some fog lamps include a halogen bulb as the light source. In this situation, a bulb shield is often positioned in front of the halogen bulb to shield against direct viewing of the light source. Such bulb shields are typically rigidly secured to the housing.

Motorcycle fog lamps also customarily include a dust cap to protect the interior of the fog lamp from contamination. Standard dust caps are mounted to the fog lamp's housing in a variety of conventional configurations.

SUMMARY OF THE INVENTION

It has been found that the rigid attachment of the light source assembly within the housing of the fog lamp facilitates the transfer of vibrations from the motorcycle to the light source assembly, which can result in premature failure of the light source. In addition, conventional bulb shields customarily cannot be removed from the fog lamp making repair or replacement of the bulb shield practically impossible without replacing the entire housing. Furthermore, the dust caps used to provide protection from contamination to the interior of the fog lamp are typically mounted to the housing of the fog lamp using conventional configurations that maintain a poor connection between the dust cap and the housing.

The present invention alleviates the above-noted problems by providing a motorcycle forward lamp that mounts the light source to an elastomer rather than directly to the housing, thereby damping vibrations coming from the motorcycle. The forward lamp further includes a bulb shield that is detachably mounted within the housing, thereby enhancing the ability to repair and/or replace the shield. In addition, the present invention provides a dust cap that engages the rest of the forward lamp in a unique manner.

More specifically, the present invention provides a motorcycle forward lamp comprising a housing having an optically transmissive lens and an opening, an elastomer member mounted to the housing, and a light source assembly mounted (e.g., detachably) to the elastomer member and positioned within the opening. In this manner, the light source assembly is vibrationally isolated from the housing by the elastomer member. Preferably, the forward lamp further includes means for aligning the elastomer member with the light source assembly, and means for aligning the elastomer member with the housing. This configuration provides alignment of the light source assembly with the housing.

The forward lamp of the present invention also provides a shield that is detachably mounted (e.g., to the housing) and positioned within the housing between the light source and the lens. Preferably, the housing includes a channel, and the shield includes an arm adapted to fit into the channel. In addition, the housing can further include a slot located on an entry side of the channel, and the arm can further include a finger adapted to fit within the slot. The above-described elastomer member can be used to secure the shield to the housing.

The forward lamp can further include a fastener and a washer secured to the housing and positioned to maintain the light source assembly in the opening, and a dust cap detachably mounted over the opening. The dust cap includes a notch in which the washer is positioned to thereby maintain the dust cap in position over the opening. Preferably, the dust cap includes a base portion and a skirt portion extending from the base portion toward the housing.

Other principal features and advantages of the invention will become apparent to those skilled in the art upon review of the following drawings, the detailed description and the attached claims.

DETAILED DESCRIPTION

Figure 1:
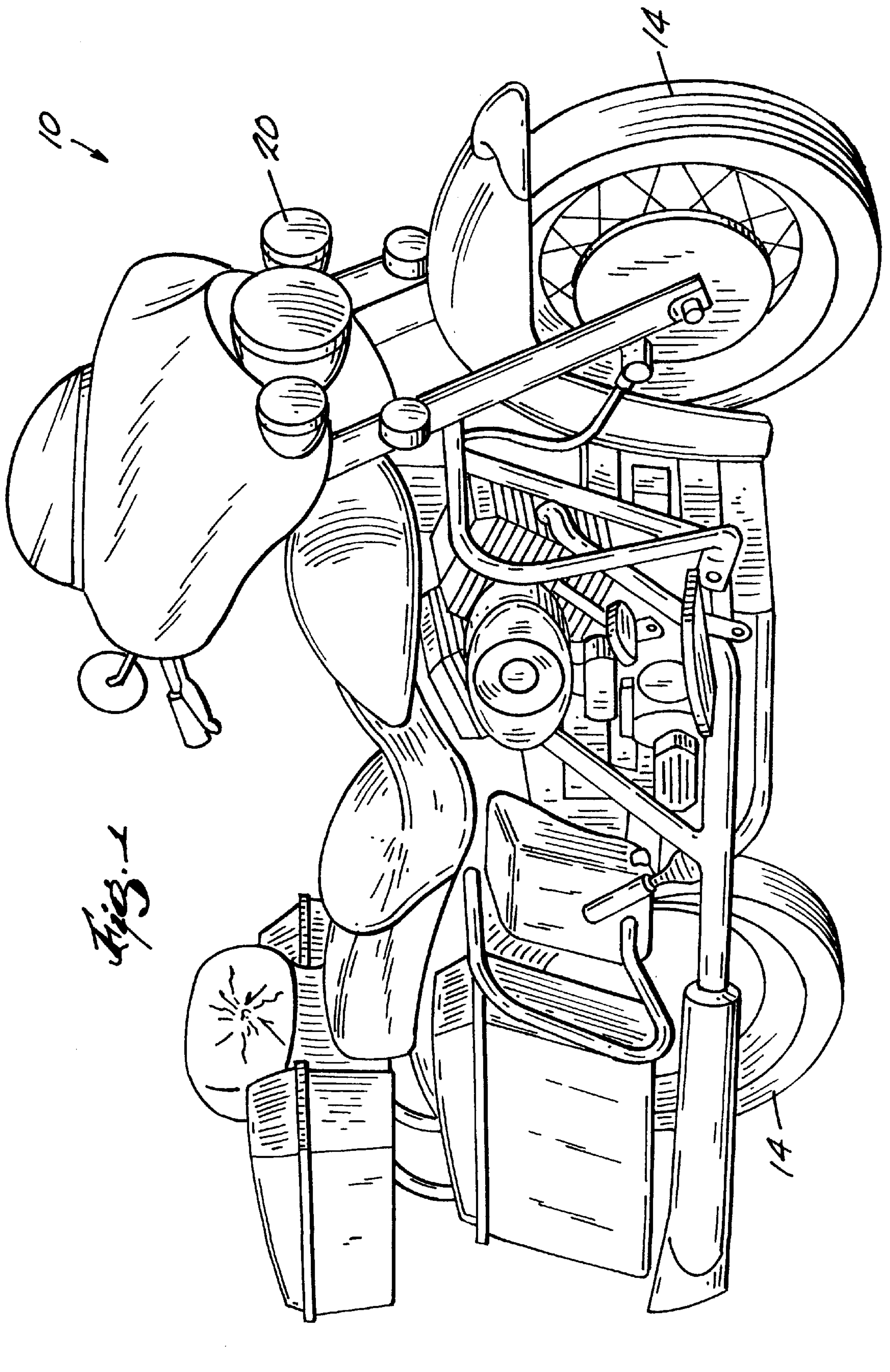
FIG. 1 is a perspective view of a motorcycle having a fog lamp embodying the present invention.
Figure 2:
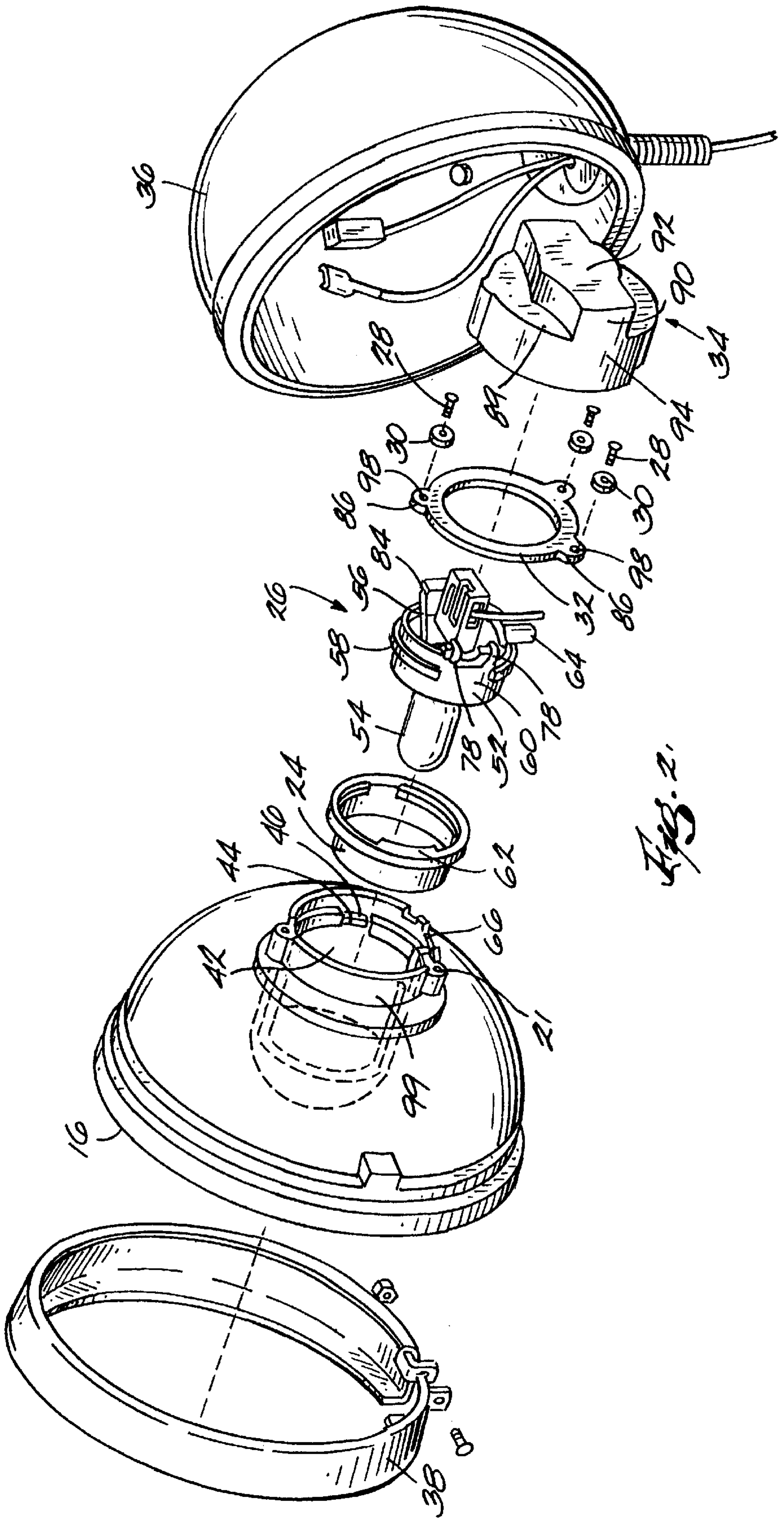
FIG. 2 is an exploded perspective view of the fog lamp of FIG. 1.
Figure 3:
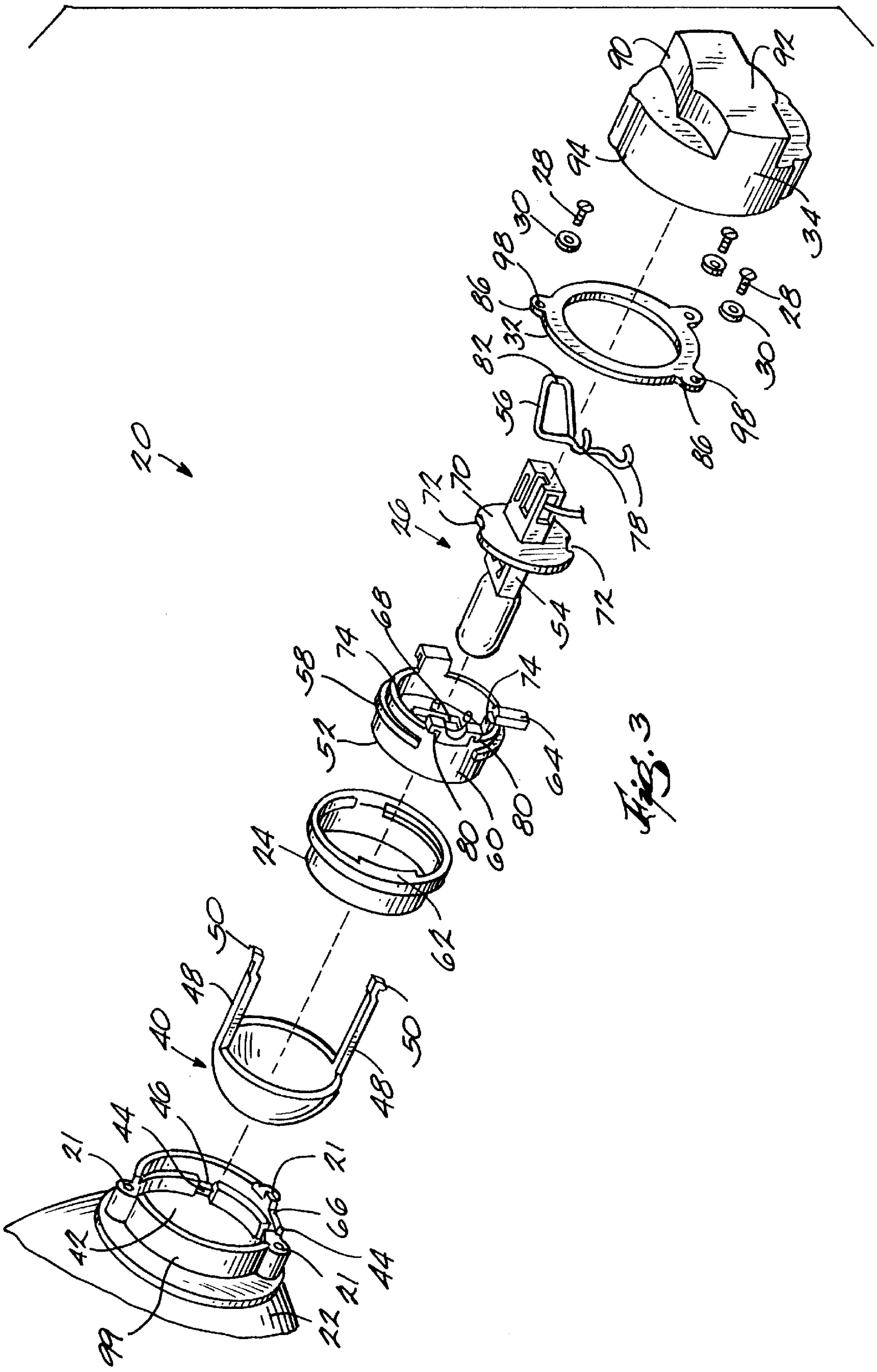
FIG. 3 is a further exploded perspective view of the motorcycle tail light of FIG. 2.

FIG. 1 shows a motorcycle 10 that includes a frame 12, wheels 14 and a forward lamp in the form of a fog lamp 20 mounted on the front end of the motorcycle 10. The fog lamp 20 is mounted to the motorcycle 10 in a conventional manner. As shown in FIGS. 2 and 3, the illustrated fog lamp 20 generally includes a housing 22, a shield 40, a front elastomer member 24, a light source assembly 26, a rear elastomer member 33, and a dust cap 34. In the illustrated embodiment, the fog lamp 20 is attached to a casing 36 by using a clamp 38.

The housing 22 includes an optically transmissive lens 16, and an opening 42 located opposite the lens 16. The opening 42 includes four channels 44 (some of which are shown) that extend axially along an inner surface of the opening 42. The channels 44 extend deeper on the entry side of the opening 42 to form slots 46.

Figure 4:
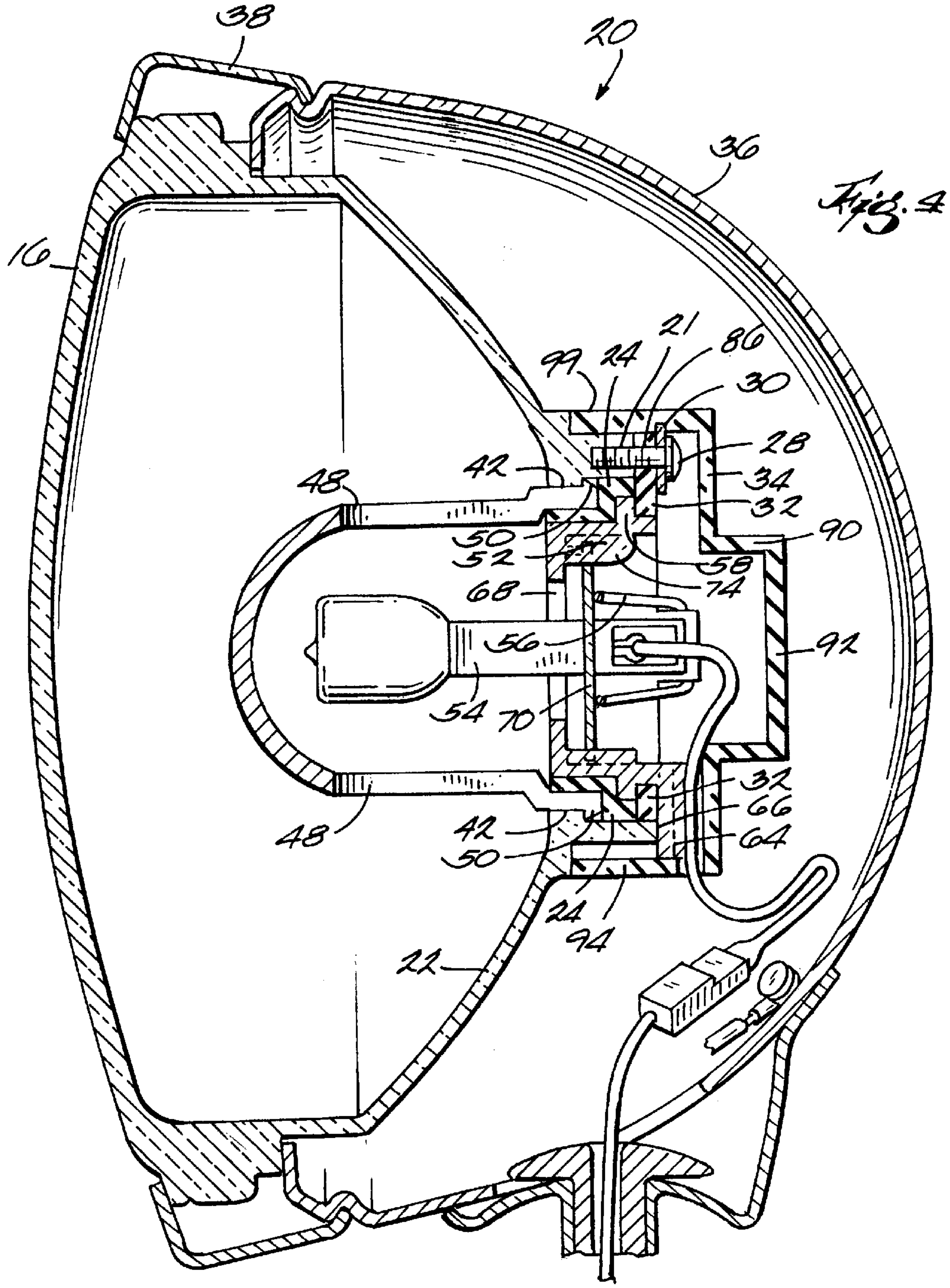
FIG. 4 is an enlarged side section view through the center of the tail light of FIG. 2.
Figure 5:
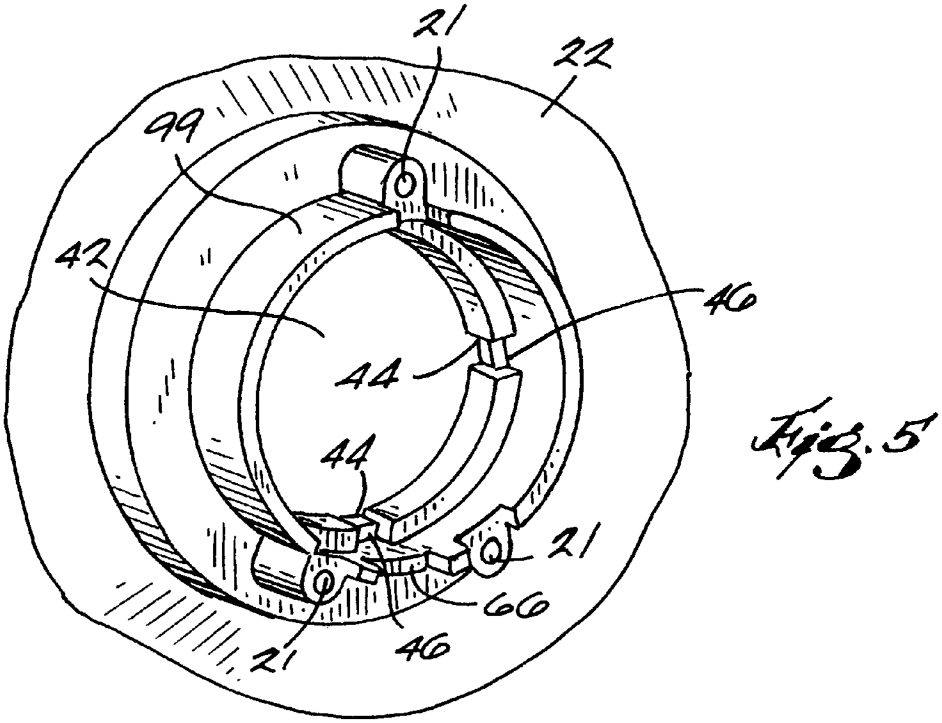
FIG. 5 is an enlarged perspective view of an opening in the housing of FIG. 2.

As illustrated in FIGS. 3, 4 and 5, the shield 40 is inserted into the housing 22 and is located between the light source assembly 26 and the lens 16 (see FIG. 4). In this regard, the channels 44 in the opening 42 are adapted to mate with arms 48 on the bulb shield 40. The arms 48 further include fingers 50 which mate with the slots 46. Inserting the arms 48 and the fingers 50 into the channels 44 and the slots 46 respectively, ensures that the bulb shield 40 is properly aligned within the housing 22.

The front elastomer member 24 is also positioned within the opening 42 in the housing 22. The front elastomer member 24 includes a projection (not shown) which fits into a channel 44 that is not occupied by any of the arms 48 of the bulb shield 40. The projection ensures that the front elastomer member 24 is properly aligned relative to the housing 22.

The light source assembly 26 is partially secured within the front elastomer member 24 and partially secured within the rear elastomer member 32. The light source assembly 26 generally includes an annular section 52, a light source 54 and a spring 56. The light source 54 is removably secured to the annular section 52 by the spring 56.

More specifically, the annular section 52 includes a flange 58 that separates the front elastomer member 24 from the rear elastomer member 32. The flange 58 includes one or more gaps 60 that receive a matching number of ribs 62 on the front elastomer member 24. The alignment of the gaps 60 and the ribs 62 ensures that the annular section 52 is properly oriented within the front elastomer member 24.

Figure 7:
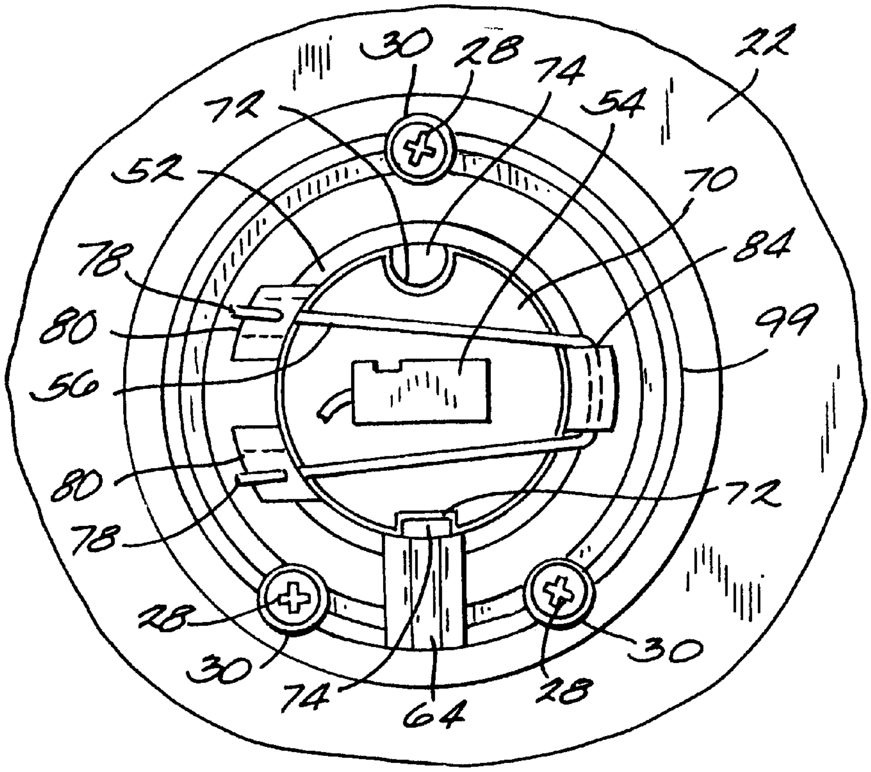
FIG. 7 is a partial rear view of the fog lamp of FIG. 2 with, he dust cap removed.

The annular section 52 of the light source assembly 26 also includes a projection 64 that fits within a step 66 located on the housing 22. Aligning the step 66 with the projection 64 orients the light source assembly 26 (via the annular section 52) into the proper position relative to the housing 22 (see FIG. 7).

The light source 54 partially extends through an opening 68 in the annular section 52. The light source 54 only partially extends through the opening 68 because the light source 54 includes a partition 70 that is larger than the opening 68. The partition 70 includes grooves 72 that mate with shoulders 74 located on the annular section 52. Each groove 72 and shoulder 74 combination may have a unique shape to ensure that the light source 54 is properly aligned relative to the annular section 52 (see FIG. 7).

The spring 56 secures the light source 54 to the annular section 52 by forcing the partition 70 against the annular section 52. The spring 56 is slightly bent and includes hooks 78 which fit under slits 80 in the annular section 52, and a rod 82 which fits under a slit 84 in the annular section 52. Although there are many spring designs, the spring 56 is illustrated as a one-piece unit. During operation of the spring 56, the hooks 78 are maneuvered under the slits 80 such that the spring 56 biases the partition 70 against the annular section 52.

Figure 8:
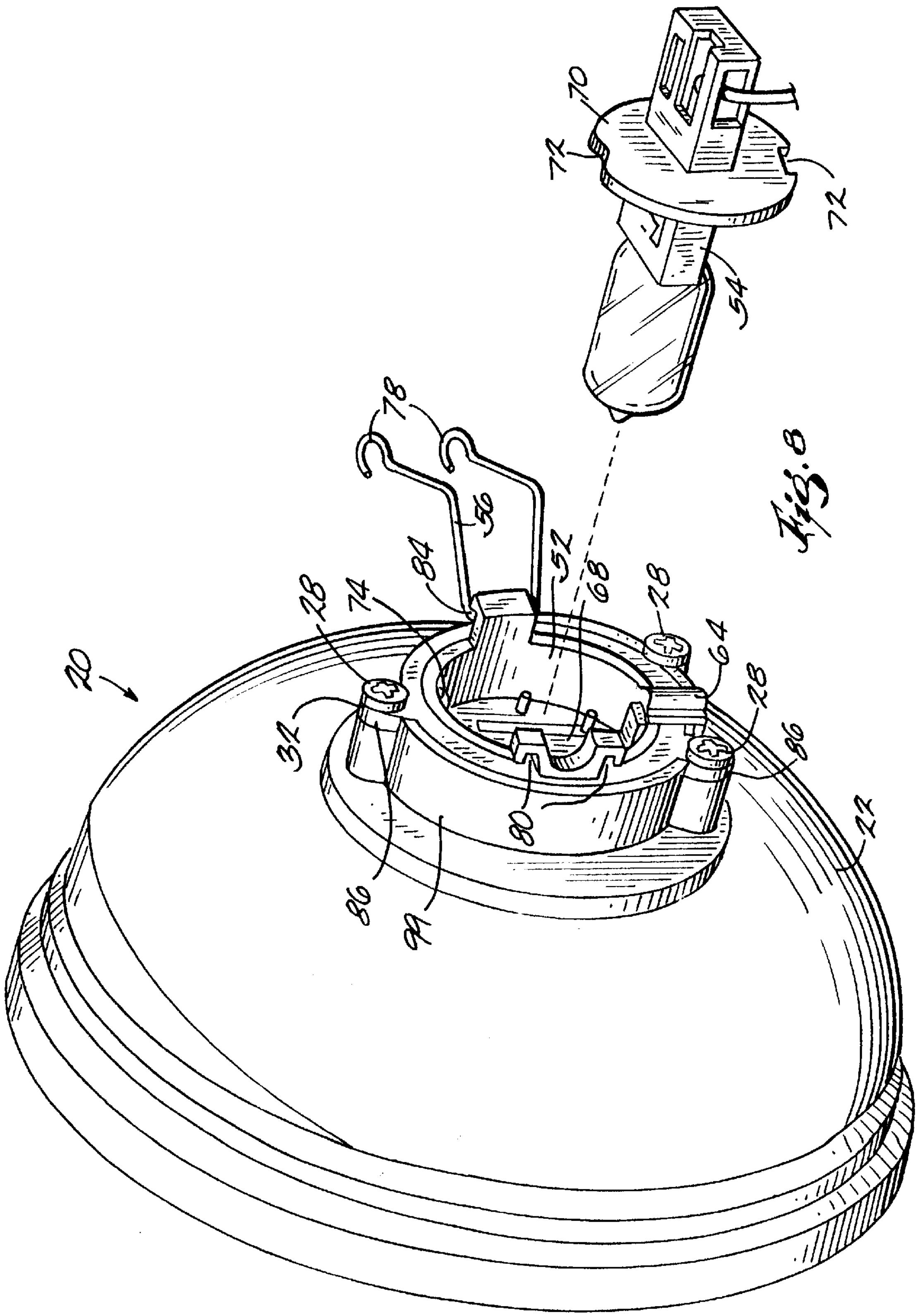
FIG. 8 is a partially assembled rear perspective view of the fog lamp of FIG. 2 with a light source removed from the light source assembly.

As shown in FIG. 8, the light source 54 can be assembled and disassembled from the fog lamp 20 without the need to disassemble any other component. During disassembly or assembly, the hooks 78 on the spring 56 are either clipped or unclipped from the slits 80 in order to insert or remove the light source 54 from the fog lamp 20.

The rear elastomer member 32 is butted up against the flange 58 when it is mounted about the annular section 52. The rear elastomer member 32 includes extensions 86 that protrude radially outward from the main body of the rear elastomer member 32. The extensions 86 include openings 98 that are aligned with openings 21 in the housing 22. The fasteners 28 extend through the washers 30 and the openings 98 the rear elastomer member 32. The fasteners 28 mate with the openings 21 in the rear elastomer member 32 to secure the rear elastomer member 32 to the housing 22.

Figure 6:
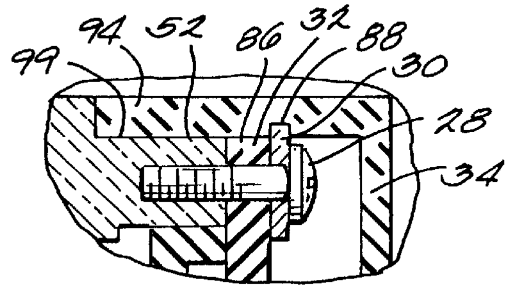
FIG. 6 is an enlarged side section view illustrating the fastener, the washer and the dust cap of FIG. 4.

The dust cap 34 is mounted over the opening 42 in the housing 22 to prevent contamination from entering the housing 22. The dust cap 34 includes a base portion 89 and a skirt portion 94 extending from the base portion 89 toward the housing 22. The dust cap 34 includes notches 88 that are located inside the skirt portion 94. The notches 88 mate with the washers 30 used to mount the rear elastomer member 32 to the housing 22 (see FIGS. 6 and 7). Positioning the washers 30 within the notches 88 provides stability to the connection between the dust cap 34 and the housing 22. The skirt portion 94 of the dust cap 34 may also be attached (e.g., by the use of adhesives) to an outer surface 99 of the housing 22. The dust cap 34 further includes a gripping portion 90 which can be manipulated (e.g., squeezed) in order to facilitate the assembly/removal of the dust cap 34 to/from the housing 22. The gripping portion 90 may further include a flat surface 92 which allows for some form of writing (e.g., a logo) to be printed on the dust cap 34.

The foregoing description of the present invention has been presented for purposes of illustration and description, furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

While only a single embodiment of the invention has been illustrated and described, it is not intended to be limited thereby but only by the scope of the appended claims.

What is claimed is:

1. A motorcycle forward lamp comprising:

a housing having an optically transmissive lens and an opening;

an elastomer member mounted to said housing; and a light source assembly mounted to said elastomer member and positioned within said opening, said light source assembly being vibrationally isolated from said housing by said elastomer member such that there is no direct contact between said housing and said light source assembly, wherein said light source assembly includes an annular section having an outer surface and a flange extending radially outward from said outer surface, said flange dividing said annular section into a front portion and a rear portion, and wherein said elastomer member includes a first elastomer member mounted on said front portion and a second elastomer member mounted on said rear portion.

2. The motorcycle forward lamp of claim 1, wherein said light source assembly is detachably mounted in said opening.

3. The motorcycle forward lamp of claim 1, further comprising means for aligning said elastomer member with said light source assembly.

4. The motorcycle forward lamp of claim 3, further comprising means for aligning said elastomer member with said housing.

5. The motorcycle forward lamp of claim 1, wherein said second elastomer member includes an outer circumference and an extension protruding radially outward from said outer circumference, said forward lamp further including a fastener positioned through said extension and secured to said housing.

6. A motorcycle forward lamp comprising:

a housing having an optically transmissive lens and an opening;

a light source assembly mounted within said opening, said light source assembly having a light source;

a shield detachably mounted and positioned within said housing, said shield being positioned between said light source and said lens; and an elastomer member positioned between said shield and said light source assembly.

7. The motorcycle forward lamp of claim 6, wherein said shield is detachably mounted to said housing.

8. The motorcycle forward lamp of claim 7, wherein said housing includes a channel, and wherein said shield includes an arm adapted to fit into said channel.

9. The motorcycle forward lamp of claim 8, wherein said housing further includes a slot located on an entry side of said channel, and wherein said arm includes a finger adapted to fit within said slot.

10. The motorcycle forward lamp of claim 7, wherein the elastomer member is mounted to said light source assembly and positioned over a portion of said shield to further secure said shield to said housing.

11. The motorcycle forward lamp of claim 10, wherein said light source assembly is mounted to said elastomer member.

12. A motorcycle forward lamp comprising:

a housing having an optically transmissive lens and an opening;

an elastomer member mounted to said housing; and a light source assembly mounted to said elastomer member and positioned within said opening, said light source assembly being isolated from said housing by said elastomer member, wherein said light source assembly includes an annular section having an outer surface and a flange extending radially outward from said outer surface, said flange dividing said annular section into a front portion and a rear portion, and wherein said elastomer member includes a first elastomer member mounted on said front portion and a second elastomer member mounted on said rear portion.

13. The motorcycle forward lamp of claim 12, wherein said second elastomer member includes an outer circumference and an extension protruding radially outward from said outer circumference, said forward lamp further including a fastener positioned through said extension and secured to said housing.

* * * * *